US012621309B2

(12) United States Patent
Lee

(10) Patent No.: US 12,621,309 B2
(45) Date of Patent: May 5, 2026

(54) VEHICLE DATA CONSISTENCY VERIFICATION SYSTEM AND METHOD

(71) Applicants: Hyundai Motor Company, Seoul (KR); Kia Corporation, Seoul (KR)

(72) Inventor: Jun Sang Lee, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 93 days.

(21) Appl. No.: 18/612,727

(22) Filed: Mar. 21, 2024

(65) Prior Publication Data

US 2025/0168173 A1     May 22, 2025

(30) Foreign Application Priority Data

Nov. 20, 2023     (KR) ........................ 10-2023-0160008

(51) Int. Cl.
*H04L 9/40*          (2022.01)
*G06F 11/30*        (2006.01)
*G06F 11/34*        (2006.01)
*G07C 5/00*         (2006.01)

(52) U.S. Cl.
CPC .............. *H04L 63/12* (2013.01); *G07C 5/008* (2013.01)

(58) Field of Classification Search
CPC ......... H04L 63/12; H04L 67/12; G07C 5/008; G06F 11/3065; G06F 11/34; G06F 16/215; G06F 17/40
USPC ............................................... 701/1
See application file for complete search history.

(56) References Cited

U.S. PATENT DOCUMENTS

| 10,810,531 | B2 * | 10/2020 | Hoover | ................ | G07C 5/0841 |
| 2020/0090425 | A1 * | 3/2020 | Senft-Grupp | ...... | G01R 31/3648 |
| 2021/0318695 | A1 * | 10/2021 | Cui | ....................... | G08G 1/0112 |
| 2025/0168173 | A1 * | 5/2025 | Lee | ........................ | G07C 5/008 |

* cited by examiner

*Primary Examiner* — Tyler D Paige
(74) *Attorney, Agent, or Firm* — MORGAN, LEWIS & BOCKIUS LLP

(57) ABSTRACT

Provided are a vehicle data consistency verification system and method allowing verification of validity and consistency of various vehicle data collected to improve vehicle quality and service. Provided are a vehicle data consistency verification system and method allowing vehicle data stored in a server to be efficiently used by improving accuracy and reliability of vehicle data through inspection of data validity and data consistency for various vehicle data transmitted from a vehicle and collected and stored on a server.

18 Claims, 14 Drawing Sheets

〈EXAMPLE OF DETERMINATION OF DATA VALIDITY OK〉

FIG. 5B

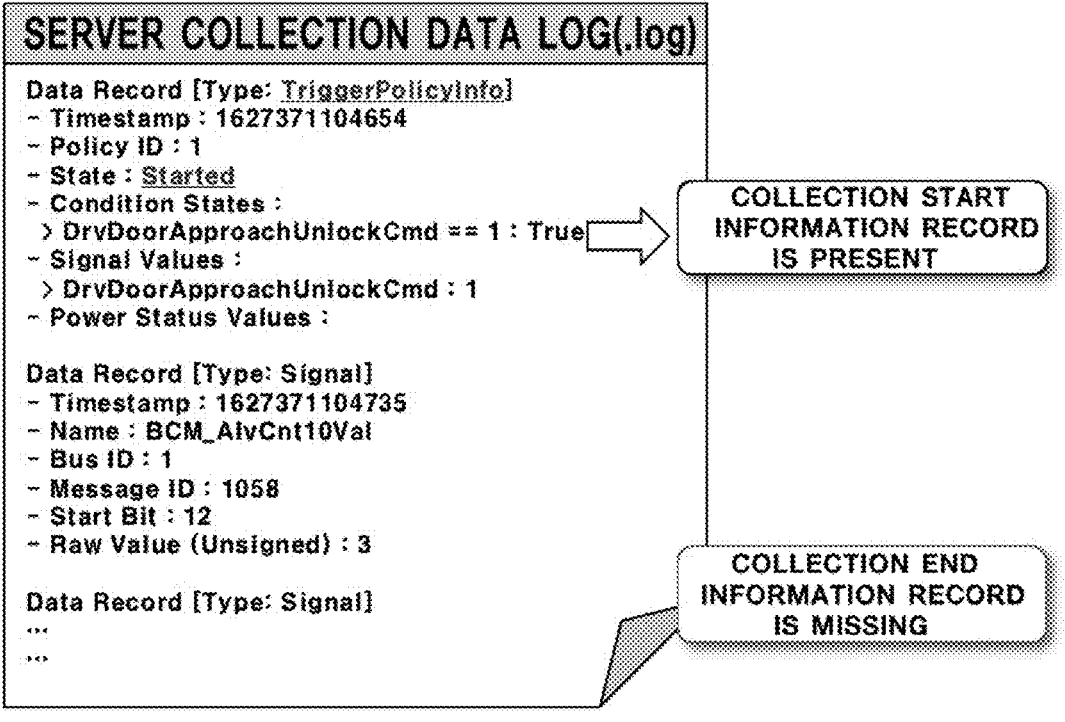

SERVER COLLECTION DATA LOG(.log)

Data Record [Type: TriggerPolicyInfo]
- Timestamp : 1627371104654
- Policy ID : 1
- State : Started
- Condition States :
  > DrvDoorApproachUnlockCmd == 1 : True
- Signal Values :
  > DrvDoorApproachUnlockCmd : 1
- Power Status Values :

Data Record [Type: Signal]
- Timestamp : 1627371104735
- Name : BCM_AlvCnt10Val
- Bus ID : 1
- Message ID : 1058
- Start Bit : 12
- Raw Value (Unsigned) : 3

Data Record [Type: Signal]
...
...

COLLECTION START INFORMATION RECORD IS PRESENT

COLLECTION END INFORMATION RECORD IS MISSING

<EXAMPLE OF DETERMINATION OF DATA VALIDITY FAIL>

<EXAMPLE OF DETERMINATION OF DATA VALIDITY OK>

<EXAMPLE OF DETERMINATION OF NORMAL REGISTRATION OK>

<EXAMPLE OF DETERMINATION OF NORMAL REGISTRATION FAIL>

VEHICLE DATA CONSISTENCY VERIFICATION SYSTEM AND METHOD

CROSS-REFERENCE TO RELATED APPLICATION

The present application claims priority to Korean Patent Application No. 10-2023-0160008 filed on Nov. 20, 2023, the entire contents of which is incorporated herein for all purposes by this reference.

BACKGROUND OF THE PRESENT DISCLOSURE

Field of the Present Disclosure

The present disclosure relates to a vehicle data consistency verification system and method. More particularly, it relates to a vehicle data consistency verification system and method allowing verification of validity and consistency of various vehicle data collected to improve vehicle quality and service.

Description of Related Art

Due to advancements in vehicle electronics technology and communication technology, it is possible to collect vehicle data generated from various electrical components and controllers mounted in a vehicle by connecting to a vehicle network through a wireless communication network.

Vehicle data collected from a vehicle is information collected only when specific security conditions are met and includes actual driving information, controller state information, event data record (EDR) information, failure information, and diagnostic information.

Vehicle data collected from the vehicle in the instant way may be used to improve productivity through vehicle manufacturing process improvement, strengthen consumer service capabilities, and generate new business models.

The collected vehicle data need to have data validity, which refers to consistency and quality of data, and data consistency, which refers to a state in which values of certain data match each other.

When the collected vehicle data does not have data validity and data consistency, there may be problems in that accuracy of comprehensive analysis work of the vehicle data is reduced, and the vehicle data cannot be efficiently utilized.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle data consistency verification system and method allowing vehicle data stored in a server to be efficiently used by improving accuracy and reliability of vehicle data through inspection of data validity and data consistency for various vehicle data transmitted from a vehicle and collected and stored on a server.

Various aspects of the present disclosure are directed to providing a vehicle data consistency verification system including a server configured to store server collection data, which is vehicle data transmitted through a gateway of a vehicle network system, and an automated data verification device configured to collect server collection data transmitted from the server, directly collect vehicle collection data, which is vehicle data generated from various electrical components and controllers of a vehicle, then inspect data validity of the server collection data and the vehicle collection data, compare the vehicle collection data and the server collection data having data validity with each other, and verify data consistency of the server collection data.

In an exemplary embodiment of the present disclosure, the automated data verification device may include a data collection unit configured to collect server collection data from the server and to collect vehicle collection data from the various electrical components and the controllers of the vehicle, data validity inspection unit configured to inspect data validity of the server collection data and the vehicle collection data collected by the data collection unit, and a data consistency determination unit configured to determine data consistency of the server collection data by comparing the vehicle collection data and the server collection data having data validity with each other.

In another exemplary embodiment of the present disclosure, the data validity inspection unit may be configured to perform log validity inspection and set validity inspection on the server collection data and the vehicle collection data collected by the data collection unit.

In yet another exemplary embodiment of the present disclosure, the data consistency determination unit may be configured to determine whether server collection data validated by the data validity inspection unit is normally registered, set a data comparison reference time and a data comparison determination range between the normally registered server collection data set and a vehicle collection data set, and determine consistency of the server collection data.

Various aspects of the present disclosure are directed to providing a vehicle data consistency verification method including collecting server collection data and vehicle collection data by a data collection unit of an automated data verification device, performing data validity inspection including log validity inspection and set validity inspection on the collected server collection data and vehicle collection data by a data validity inspection unit of the automated data verification device, determining whether server collection data determined as data validity OK is normally registered by a data consistency determination unit of the automated data verification device, setting a data comparison reference time and a comparison determination range of a vehicle collection data set and a server collection data set determined as normal data registration OK by a data consistency determination unit of the automated data verification device, and determining data consistency to determine whether comparison target data of server collection data present within the comparison reference time and the comparison determination range is the same as comparison target data of vehicle collection data.

Other aspects and exemplary embodiments of the present disclosure are discussed infra.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example, vehicles powered by both gasoline and electricity.

The methods and apparatuses of the present disclosure have other features and advantages which will be apparent from or are set forth in more detail in the accompanying drawings, which are incorporated herein, and the following Detailed Description, which together serve to explain certain principles of the present disclosure. The above and other features of the present disclosure are discussed infra.

BRIEF DESCRIPTION OF THE DRAWINGS

FIG. 5B is a diagram illustrating an example of determination of data validity FAIL as a result value of log validity inspection for the server collection data and the vehicle collection data in the vehicle data consistency verification method according to an exemplary embodiment of the present disclosure;

Figure 1:
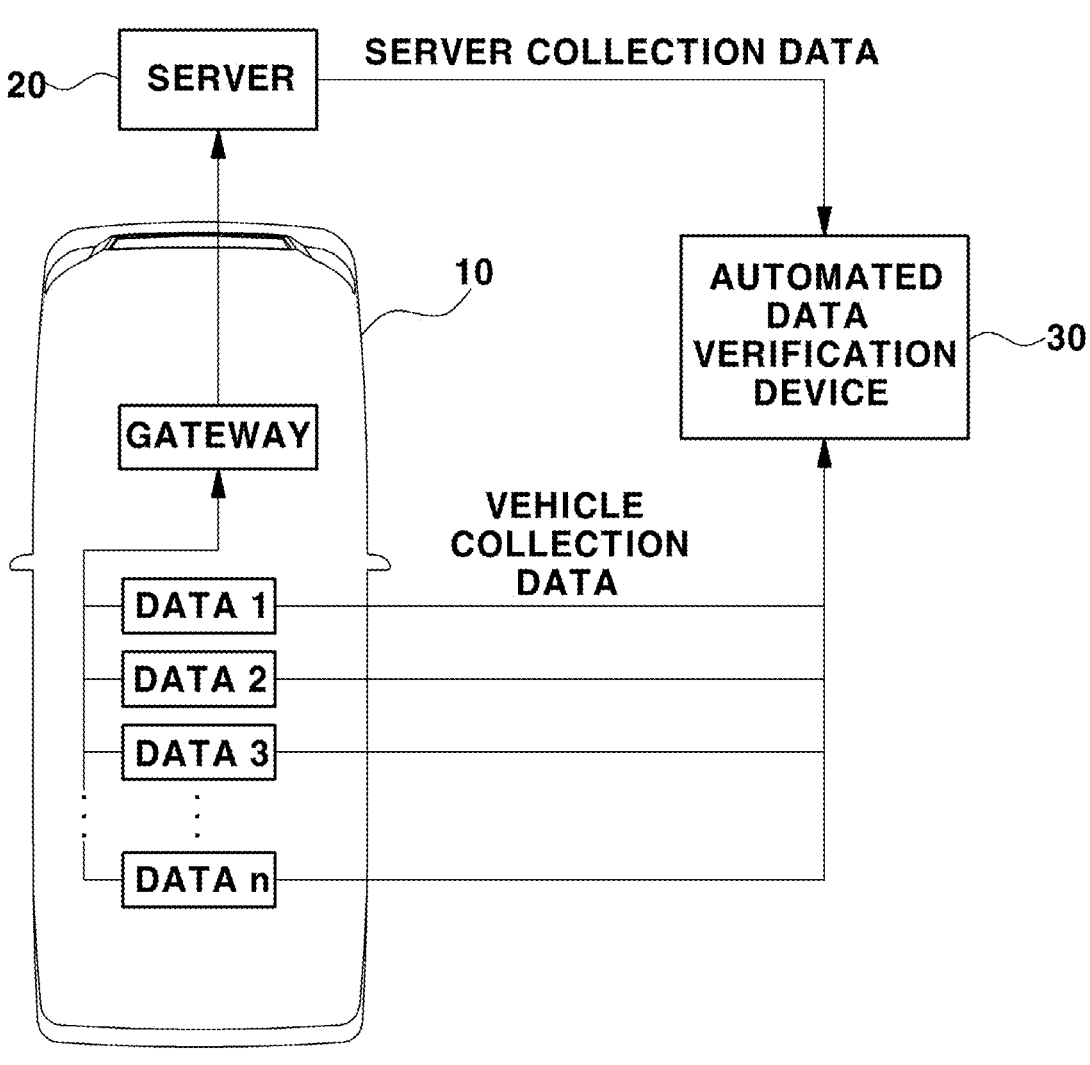
FIG. 1 is a schematic diagram illustrating a vehicle data consistency verification system according to an exemplary embodiment of the present disclosure.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural or functional descriptions presented in the exemplary embodiments of the present specification are only illustrative for describing embodiments according to the concept of the present disclosure, and the exemplary embodiments according to the concept of the present disclosure may be implemented in various forms. Furthermore, the present disclosure should not be construed as being limited to the exemplary embodiments described herein, and should be understood to include all modifications, equivalents, and substitutes included in the spirit and scope of the present disclosure.

In the present specification, even though terms such as "first," "second," etc. may be used to describe various elements, the elements are not limited by these terms. These terms are only used to distinguish one element from another. For example, within the scope not departing from the scope of rights according to the concept of the present disclosure, a first element may be referred to as a second element, and similarly, the second element may be referred to as the first element.

Hereinafter, the present disclosure will be described in detail with reference to the appended drawings.

Figure 2:
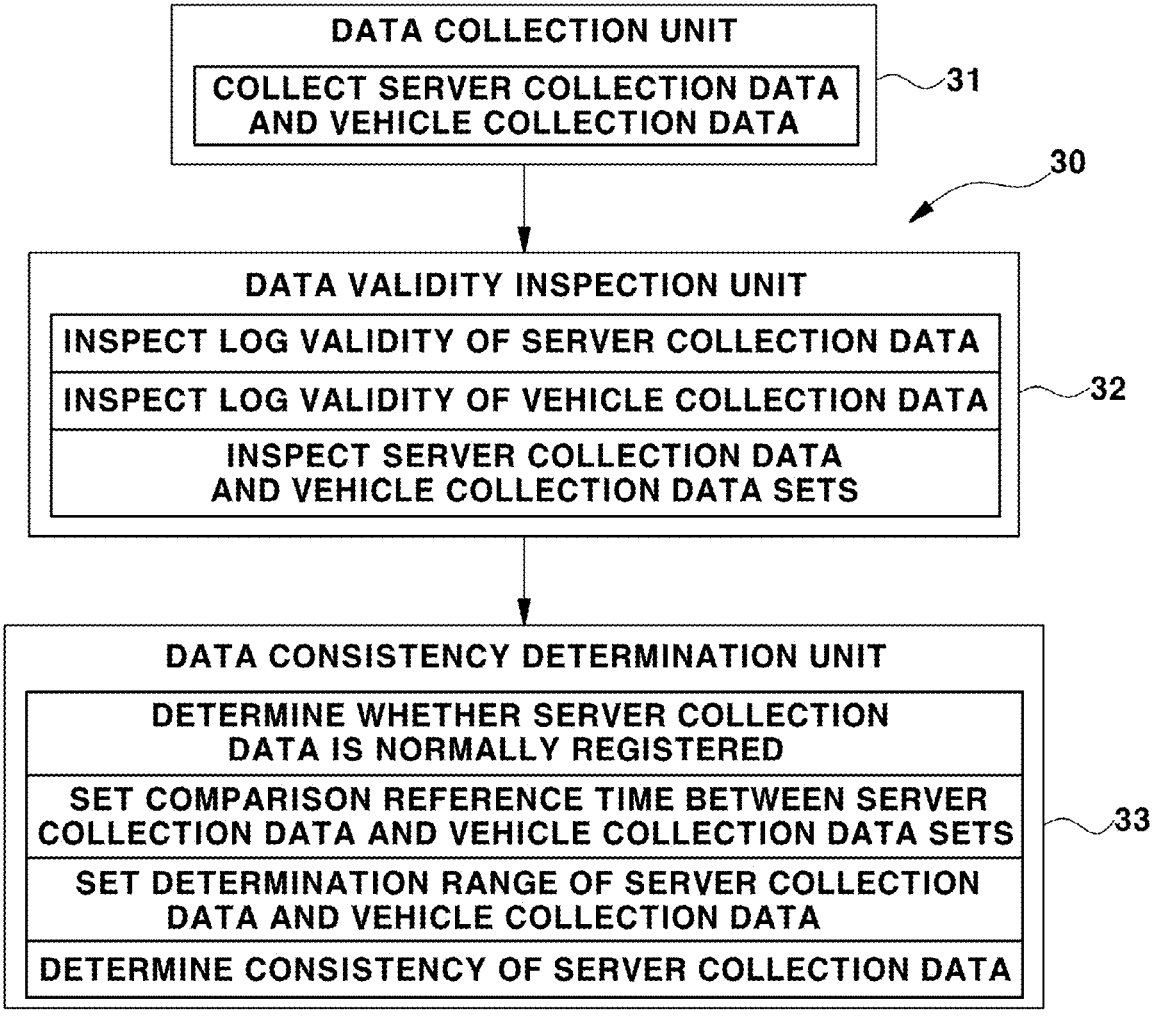
FIG. 2 is a block diagram illustrating a configuration of an automated data verification device of the vehicle data consistency verification system according to an exemplary embodiment of the present disclosure.

The attached FIG. 1 is a schematic diagram illustrating a vehicle data consistency verification system according to an exemplary embodiment of the present disclosure, and FIG. 2 is a block diagram illustrating a configuration of an automated data verification device of the vehicle data consistency verification system according to an exemplary embodiment of the present disclosure.

As shown in FIG. 1, the vehicle data consistency verification system according to an exemplary embodiment of the present disclosure includes a server 20 configured to collect and store vehicle data transmitted through a server-dedicated gateway included in a network system of a vehicle 10, and an automated data verification device 30 configured to verify data consistency for vehicle data stored in the server 20 by comparing vehicle data collected directly from the vehicle 10 with vehicle data stored in the server 20.

In the present instance, vehicle data transmitted and stored in the server 20 through the server-dedicated gateway included in the network system of the vehicle 10 means server collection data, vehicle data collected directly from the vehicle 10 by the automated data verification device 30 means vehicle collection data.

The server 20 may be a Vehicle Customer Relationship Management (VCRM) server configured to collect and store vehicle customer management data in real time, and various vehicle data stored in the server 20 may be usefully used for various purposes, such as improving productivity through improvement of vehicle manufacturing processes, strengthening consumer service capabilities, and generating new business models.

To the present end, as the vehicle customer management data, various vehicle data (for example, actual driving information, state information of the controller, accident recording device information, failure information, diagnostic information, etc.) generated from various electrical components and controllers of the vehicle is transmitted to and stored in the server 20 through the server-dedicated gateway included in the network system of the vehicle 10.

However, the server collection data, which is vehicle data collected and stored in the server 20, may be usefully used for various purposes, such as improving productivity through improvement of vehicle manufacturing processes, strengthening consumer service capabilities, and generating new business models in the future only when not only data validity but also data consistency are ensured.

Accordingly, a main focus of the present disclosure is that data validity and data consistency for server collection data, which is vehicle data stored in the server 20, may be verified using the automated data verification device 30.

To the present end, the automated data verification device 30 is configured to be able to receive server collection data, which is vehicle data stored in the server, from the server 20 while being communicatively connected to the server 20, and to be able to directly collect vehicle collection data, which is vehicle data generated from various electrical components and controllers, while being communicatively connected to various electrical components and controllers mounted in the vehicle. The automated data verification device 30 may be a computer disposed at a specific place (control center) to collect server collection data transmitted from the server 20.

The automated data verification device 30 is configured to inspect data validity for the server collection data received from the server 20 and vehicle collection data directly collected from the vehicle 10, and to verify data consistency for server collection data by comparing vehicle collection data and server collection data having data validity with each other.

In the present instance, the vehicle collection data collected directly from the vehicle 10 is used as comparison reference data for verifying data consistency of the server collection data stored in the server 20.

To the present end, as shown in FIG. 2, the automated data verification device 30 may include a data collection unit 31 configured to collect server collection data from the server 20 and vehicle collection data from the vehicle 10, a data validity inspection unit 32 configured to inspect data validity for server collection data and vehicle collection data collected by the data collection unit 31, and a data consistency determination unit 33 configured to determine data consistency for the server collection data by comparing the vehicle collection data with the server collection data having data validity with each other.

The data collection unit 31 of the automated data verification device 30 is communicatively connected to the server 20 and the vehicle 10 and is configured to collect server collection data from the server 20 and directly collect vehicle collection data from the vehicle 10.

The data validity inspection unit 32 of the automated data verification device 30 is configured to perform log validity inspection on the server collection data and the vehicle collection data collected by the data collection unit 31, and to perform set validity inspection on the server collection data and the vehicle collection data.

In the present instance, the log validity inspection refers to inspecting whether all information of the vehicle included in the server collection data and the vehicle collection data is valid, and the set validity inspection refers to inspecting whether the number of data sets of the server collection data is the same as the number of data sets of the vehicle collection data.

The data consistency determination unit 33 of the automated data verification device 30 is configured to determine whether the server collection data validated by the data validity inspection unit 32 is normally registered, and to determine consistency of the server collection data by setting a data comparison reference time and a data comparison determination range between a normally registered server collection data set and a vehicle collection data set.

In the present instance, determining whether the server collection data is normally registered refers to verifying whether data registered in advance as a collection item in the server collection data validated by the data validity inspection unit 32, that is, data set as a collection item in advance, is present.

Here, the vehicle data consistency verification method of the present disclosure based on the above-described configuration will be sequentially described.

Figure 3:
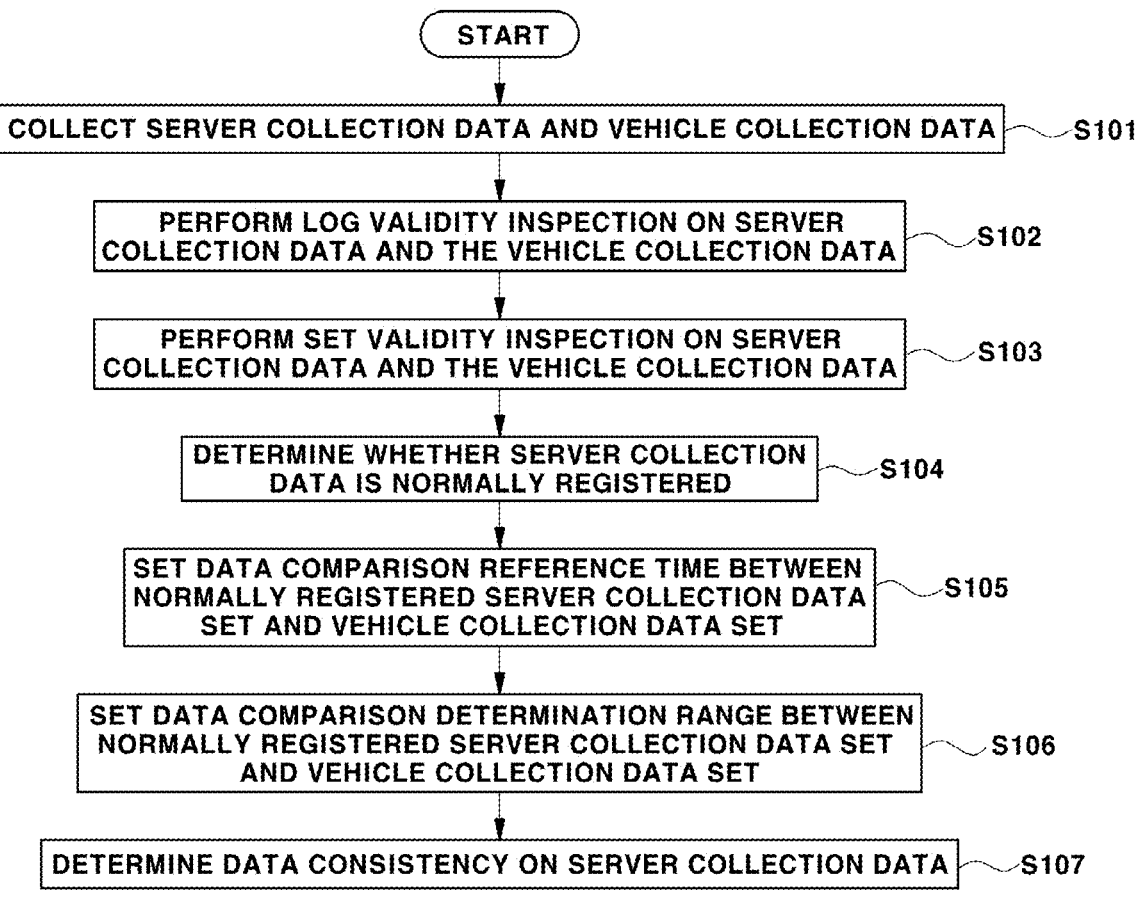
FIG. 3 is a flowchart illustrating a vehicle data consistency verification method according to an exemplary embodiment of the present disclosure.

The attached FIG. 3 is a flowchart illustrating the vehicle data consistency verification method according to an exemplary embodiment of the present disclosure.

First, server collection data and vehicle collection data are collected by the data collection unit 31 of the automated data verification device 30 (S101).

To the present end, the automated data verification device 30 may receive and collect server collection data, which is vehicle data stored in the server, from the server 20, and directly collect vehicle collection data, which is vehicle data generated from various electrical components and controllers, while being communicatively connected to various electrical components and controllers mounted in the vehicle.

Subsequently, a log validity inspection step is performed on the server collection data and the vehicle collection data collected by the data collection unit 31 by the data validity inspection unit 32 of the automated data verification device 30 (S102).

Figure 4:
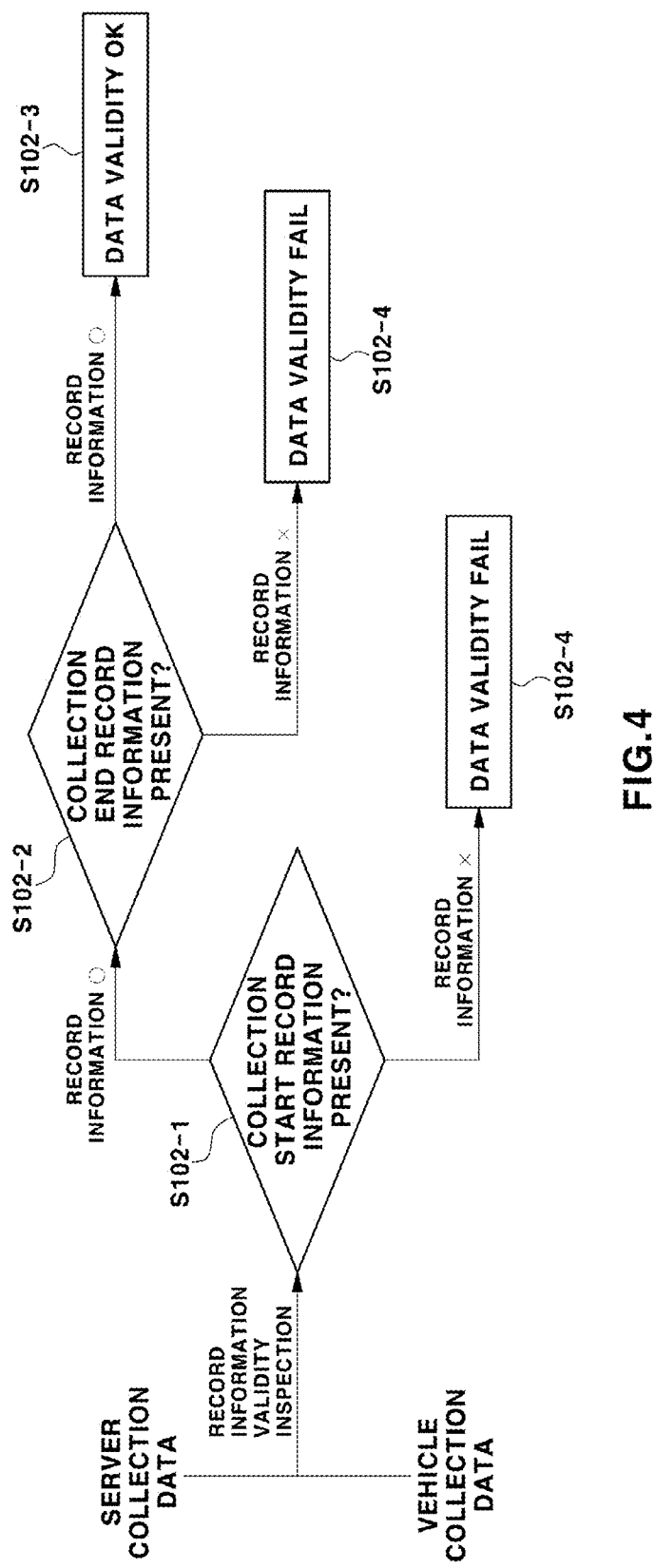
FIG. 4 is a flowchart illustrating a log validity inspection step for server collection data and vehicle collection data in a vehicle data consistency verification method according to an exemplary embodiment of the present disclosure.

To the present end, as shown in a flowchart of FIG. 4, the log validity inspection step for the server collection data and the vehicle collection data includes a process of determining whether collection start record information for the server collection data and the vehicle collection data is present (S102-1), and a process of determining whether collection end record information exists for the server collection data and the vehicle collection data is present (S102-2).

Accordingly, in the process S102-1, upon determining that the collection start record information is not present in the server collection data and the vehicle collection data, the data validity inspection unit 32 is configured to determine data validity for the server collection data and the vehicle collection data as FAIL (S102-4).

Furthermore, in the process S102-2, upon determining that the collection end record information is not present in the server collection data and the vehicle collection data, the data validity inspection unit 32 is configured to determine data validity for the server collection data and the vehicle collection data as FAIL (S102-4).

On the other hand, upon determining that the collection start record information is present in the server collection data and the vehicle collection data in the process S102-1, and the collection end record information is present in the server collection data and the vehicle collection data in the process S102-2, the data validity inspection unit 32 is configured to determine data validity for the server collection data and the vehicle collection data as OK (S102-3).

Figure 5A:
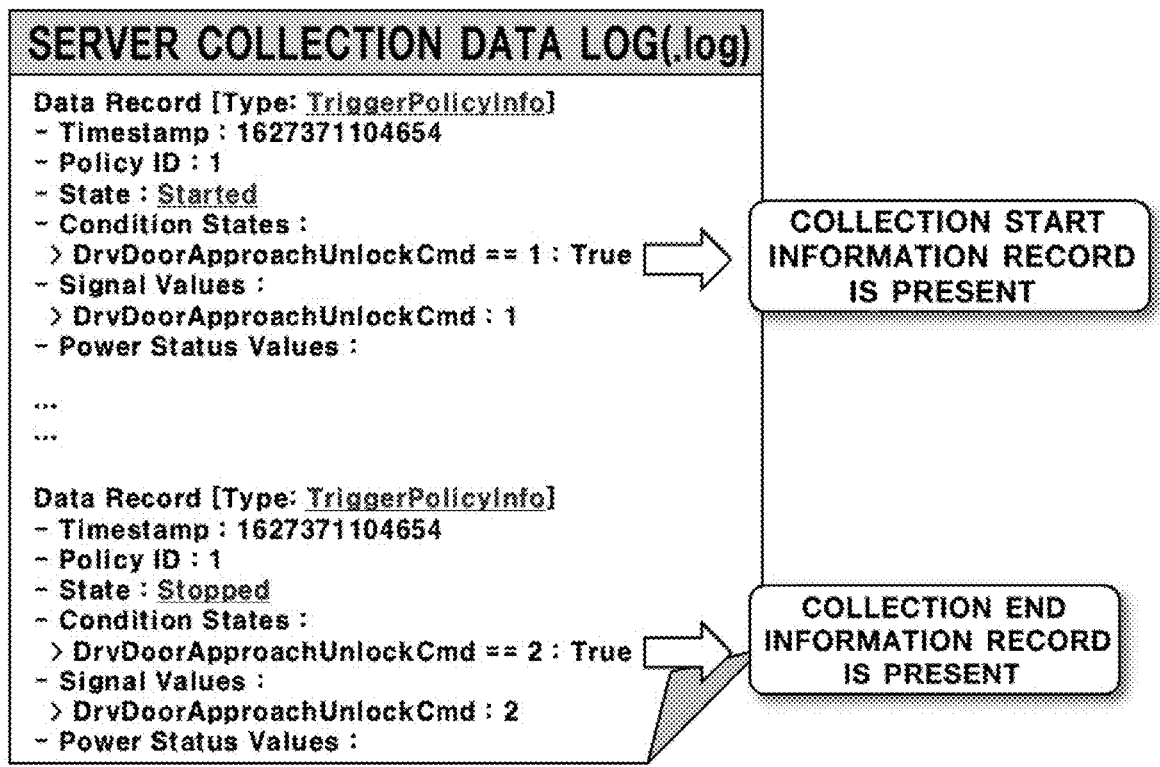
FIG. 5A is a diagram illustrating an example of determination of data validity OK as a result value of log validity inspection for the server collection data and the vehicle collection data in the vehicle data consistency verification method according to an exemplary embodiment of the present disclosure.

For example, the data validity inspection unit 32 of the automated data verification device 30 is configured to determine data validity as OK when the collection start record information and the collection end record information are present in the server collection data as shown in FIG. 5A illustrating an example of results of the log validity inspection step including the processes S102-1 to S102-4, and is configured to determine data validity as FAIL when the collection start record information is present and the collection end record information is not present in the server collection data as shown in FIG. 5B.

In the present way, the data validity inspection unit 32 of the automated data verification device 30 is configured to perform log validity inspection and transmits server collection data and vehicle collection data determined as data validity OK to the data consistency determination unit 33.

Subsequently, the data validity inspection unit 32 of the automated data verification device 30 is configured to perform a set validity inspection step on the server collection data and the vehicle collection data collected by the data collection unit 31 (S103).

Figure 6:
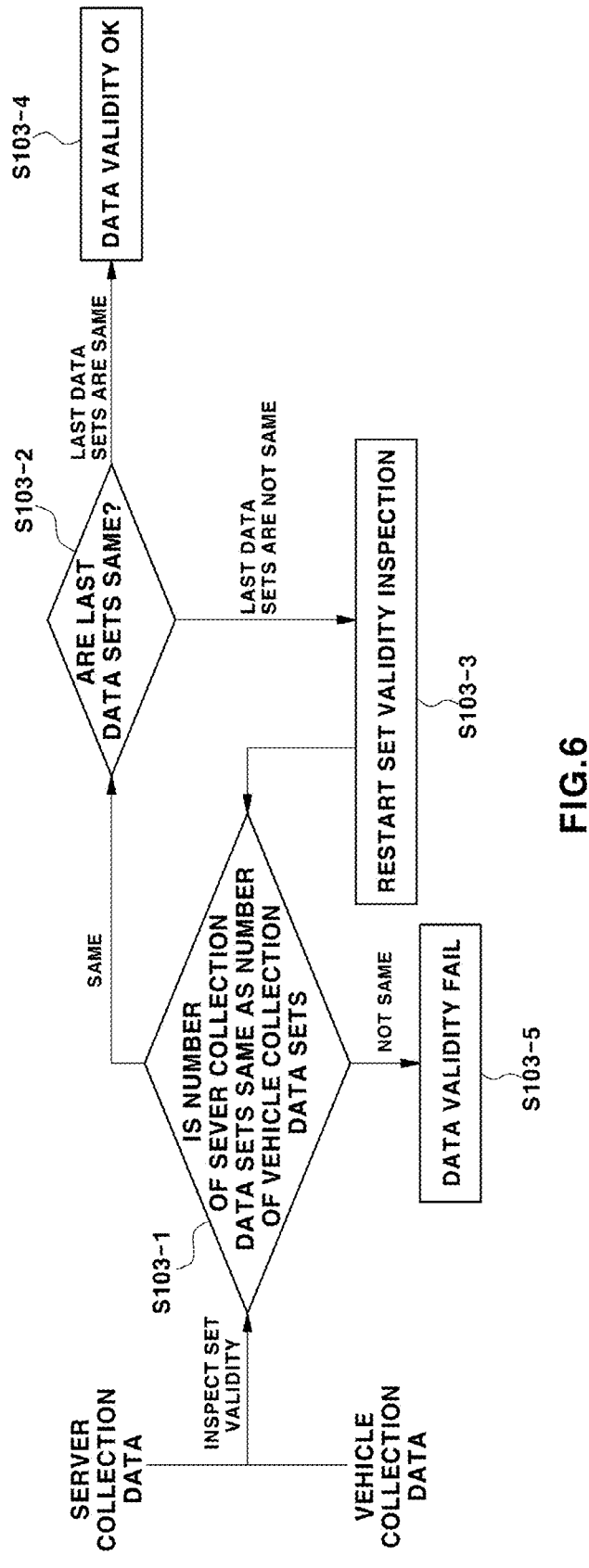
FIG. 6 is a flowchart illustrating a set validity inspection step for the server collection data and the vehicle collection data in the vehicle data consistency verification method according to an exemplary embodiment of the present disclosure.

To the present end, as shown in a flowchart of FIG. 6, the set validity inspection step for the server collection data and the vehicle collection data includes a process S103-1 of determining whether the number of server collection data sets is the same as the number of vehicle collection data sets, and a process S103-2 of determining whether a last data set of the server collection data sets is the same as a last data set of the vehicle collection data sets.

In the present instance, the process of determining whether the number of server collection data sets is the same as the number of vehicle collection data sets is to determine whether the number of a plurality of server collection data sets is the same as the number of a plurality of vehicle collection data sets to determine reliability of matching between the server collection data and the vehicle collection data.

Furthermore, the process of determining whether a last data set of the server collection data sets is the same as a last data set of the vehicle collection data sets is to finally determine whether the number of last data sets of the server collection data sets is the same as the number of last data sets of the vehicle collection data sets to further enhance reliability of matching between the server collection data and the vehicle collection data.

Accordingly, upon determining that the number of server collection data sets is different from the number of vehicle collection data sets in the process S103-1, the data validity inspection unit 32 is configured to determine data validity for the server collection data and the vehicle collection data as FAIL (S103-5).

Furthermore, when the last data set of the server collection data sets is different from the last data set of the vehicle collection data sets in the process S103-2, set validity inspection is restarted considering that there may be a mismatch due to an inspection error (S103-3).

On the other hand, upon determining that the number of server collection data sets is the same as the number of vehicle collection data sets in the process S103-1, and upon determining that the last data set of the server collection data sets is the same as the last data set of the vehicle collection data sets in the process S103-2, the data validity inspection unit 32 is configured to determine data validity for the server collection data and the vehicle collection data as OK (S103-4).

In the present way, the data validity inspection unit 32 of the automated data verification device 30 performs set validity inspection, determines that data validity is OK when the number of server collection data sets and the number of vehicle collection data sets are both n, and determines that data validity is FAIL when the number of server collection data sets is n and the number of vehicle collection data sets is n−1.

Figure 7:
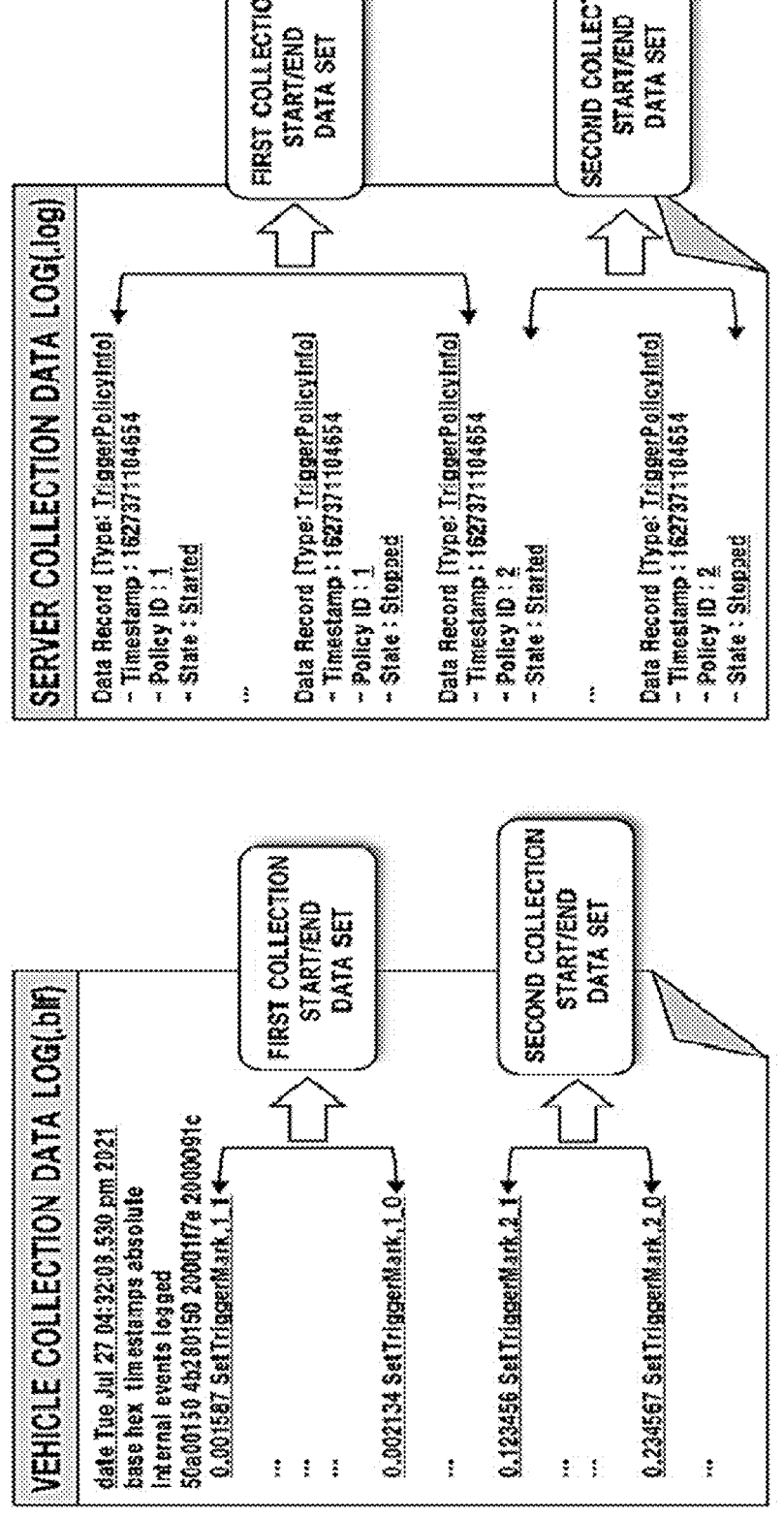
FIG. 7 is a diagram illustrating an example of determination of data validity OK as a result value of set validity inspection for the server collection data and the vehicle collection data in the vehicle data consistency verification method according to an exemplary embodiment of the present disclosure.

For example, as shown in FIG. 7 illustrating an example of results of set validity inspection including the processes S103-1 to S103-5, the data validity inspection unit 32 of the automated data verification device 30 determines data validity as OK when a first collection/end data set is present and a second collection/end data set is present at the same time in the server collection data set, and a first collection/end data set is present and a second collection/end data set is present at the same time in the vehicle collection data set.

In the present way, the data validity inspection unit 32 of the automated data verification device 30 is configured to perform data validity inspection including log validity inspection and set validity inspection, and the server collection data and the vehicle collection data determined as data validity OK are transmitted to the data consistency determination unit 33.

Next, a step of determining whether the server collection data, which is determined to be data validity OK by the data consistency determination unit 33 of the automated data verification device 30, is normally registered is performed (S104).

In the present instance, as described above, determining whether the server collection data is normally registered refers to verifying whether data registered as a collection item in the server collection data validated by the data validity inspection unit 32, that is, data set as a collection item in advance, is present.

Figure 8:
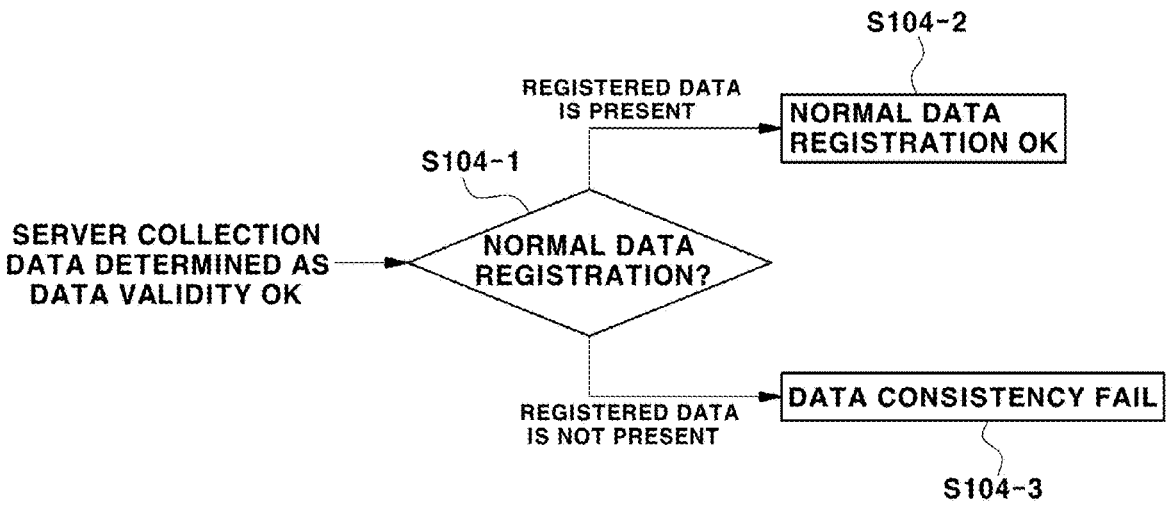
FIG. 8 is a flowchart illustrating a step of determining whether server collection data determined to be data validity OK is normally registered in the vehicle data consistency verification method according to an exemplary embodiment of the present disclosure.

To the present end, as shown in a flowchart of FIG. 8, the step of determining whether the server collection data, which is determined to be data validity OK, is normally registered includes a process S104-1 of verifying whether data registered as a collection item in the server collection data validated by the data validity inspection unit 32, that is, data set as a collection item in advance, is present, a process S104-2 of determining normal data registration as OK when data registered as a collection item is present in the server collection data, and a process S104-3 of determining normal data registration as FAIL when data registered as a collection item is not present in the server collection data.

In the present instance, determining normal data registration as FAIL when data registered as a collection item is not present in the server collection data refers to determining data consistency for the server collection data, which is vehicle data stored in the server 20, as FAIL.

Figure 9A:
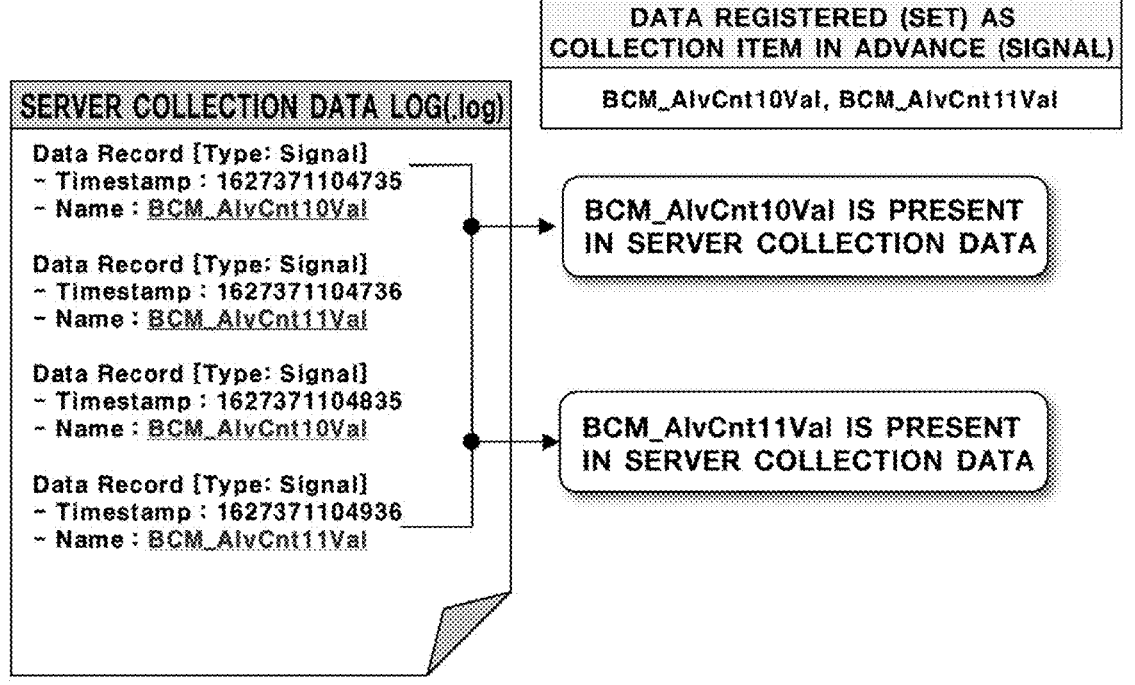
FIG. 9A is a diagram illustrating an example of determination of normal data registration OK as a result value of determining whether the server collection data is normally registered in the vehicle data consistency verification method according to an exemplary embodiment of the present disclosure.
Figure 9B:
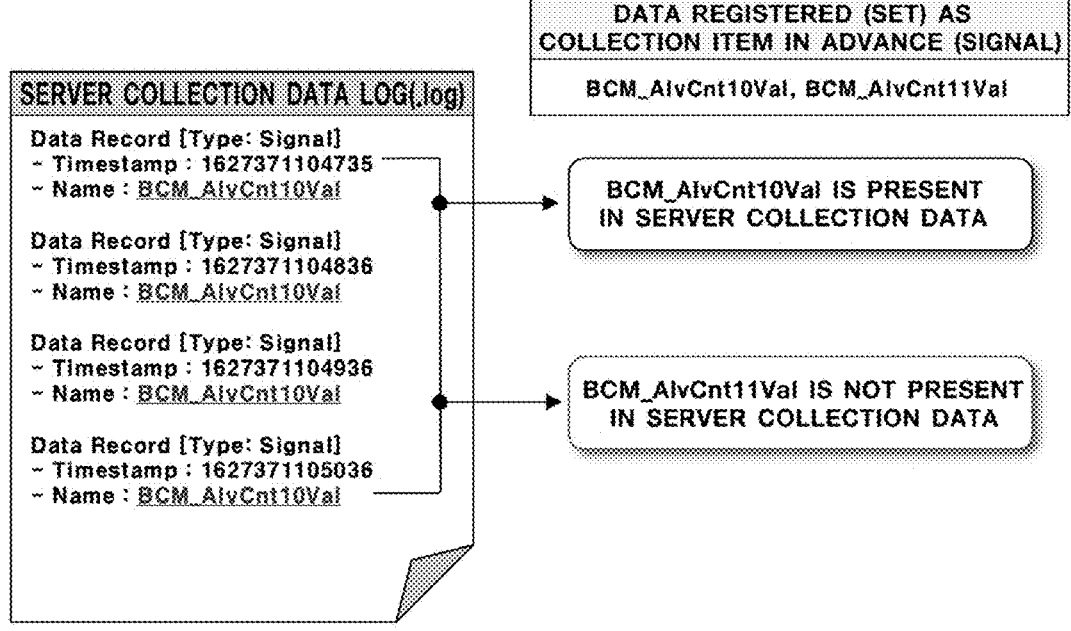
FIG. 9B is a diagram illustrating an example of determination of normal data registration FAIL as a result value of determining whether the server collection data is normally registered in the vehicle data consistency verification method according to an exemplary embodiment of the present disclosure.
Figure 10:
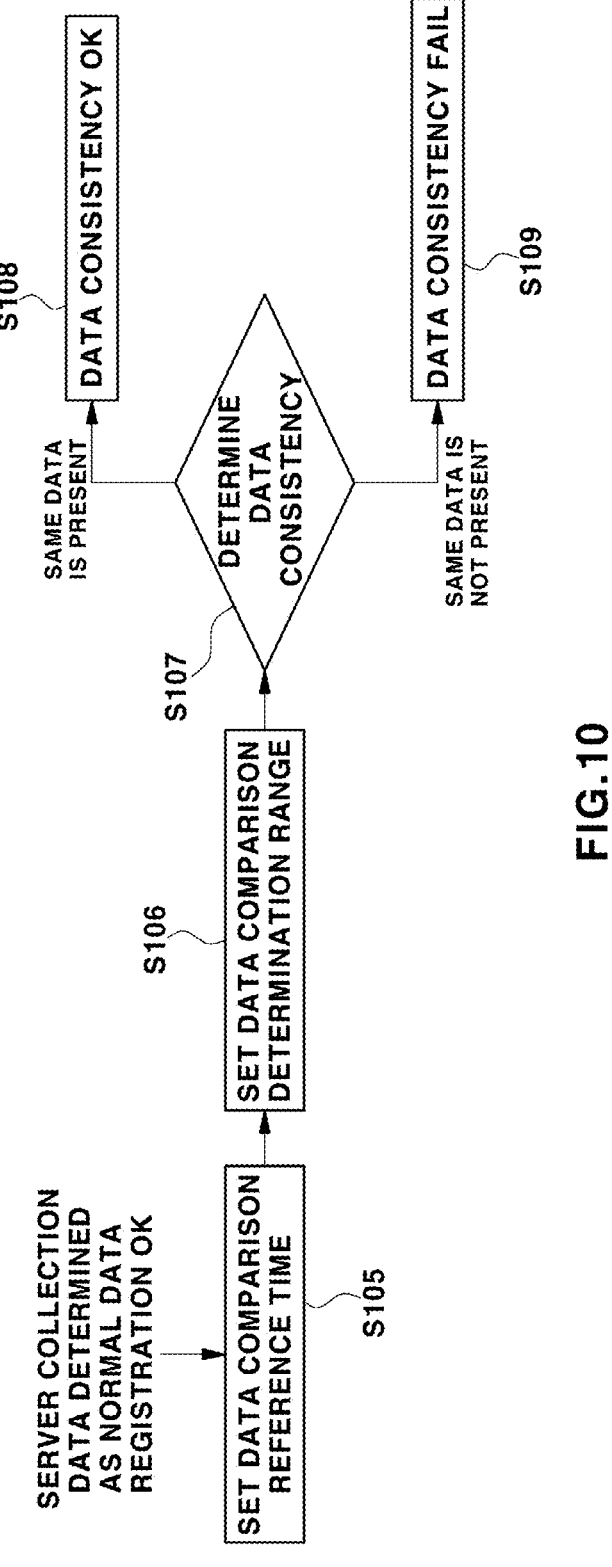
FIG. 10 is a flowchart illustrating process of setting a data comparison reference time and a data comparison determination range of a normally registered server collection data set and vehicle collection data set and determining consistency of server collection data in the vehicle data consistency verification method according to an exemplary embodiment of the present disclosure.

For example, as shown in FIG. 9A illustrating an example of results of determining whether the server collection data is normally registered including the processes S104-1 to S104-3, the data consistency determination unit 33 of the automated data verification device 30 determines normal data registration as OK when data registered as a collection item, that is, data set as a collection item in advance, is present in the server collection data. On the other hand, as shown in FIG. 9B, the data consistency determination unit 33 determines normal data registration as FAIL when data registered as a collection item, that is, data set as a collection item in advance, is not present in the server collection data.

Accordingly, because the main purpose of the present disclosure is to verify data consistency for the server collection data, which is vehicle data stored in the server 20, when data registered as a collection item is not present in the server collection data, the data consistency determination unit 33 of the automated data verification device 30 determines data consistency for the server collection data, which is vehicle data stored in the server 20, as FAIL, and finally determines the server collection data stored in the server as data having poor data consistency, which has limitations in being efficiently used for various purposes.

On the other hand, as there is data set as a collection item in advance in the server collection data determined as OK in step S104-2, that is, server collection data, data consistency of the server collection data, for which data normal registration is determined to be OK, is determined by being compared with the vehicle collection data.

As next steps therefor, a step S105 of setting a data comparison reference time of the vehicle collection data set and the server collection data set for which normal data registration is determined to be OK by the data consistency determination unit 33 of the automated data verification device 30, and a step S106 of setting a comparison determination range of the vehicle collection data set and the server collection data set for which normal data registration is determined to be OK are performed.

The comparison reference time of the server collection data set may be set to a timestamp value included in a collection start information record of the server collection data set, and the comparison reference time of the vehicle collection data set may be set to a timestamp value included in collection start information of the vehicle collection data set.

Figure 11:
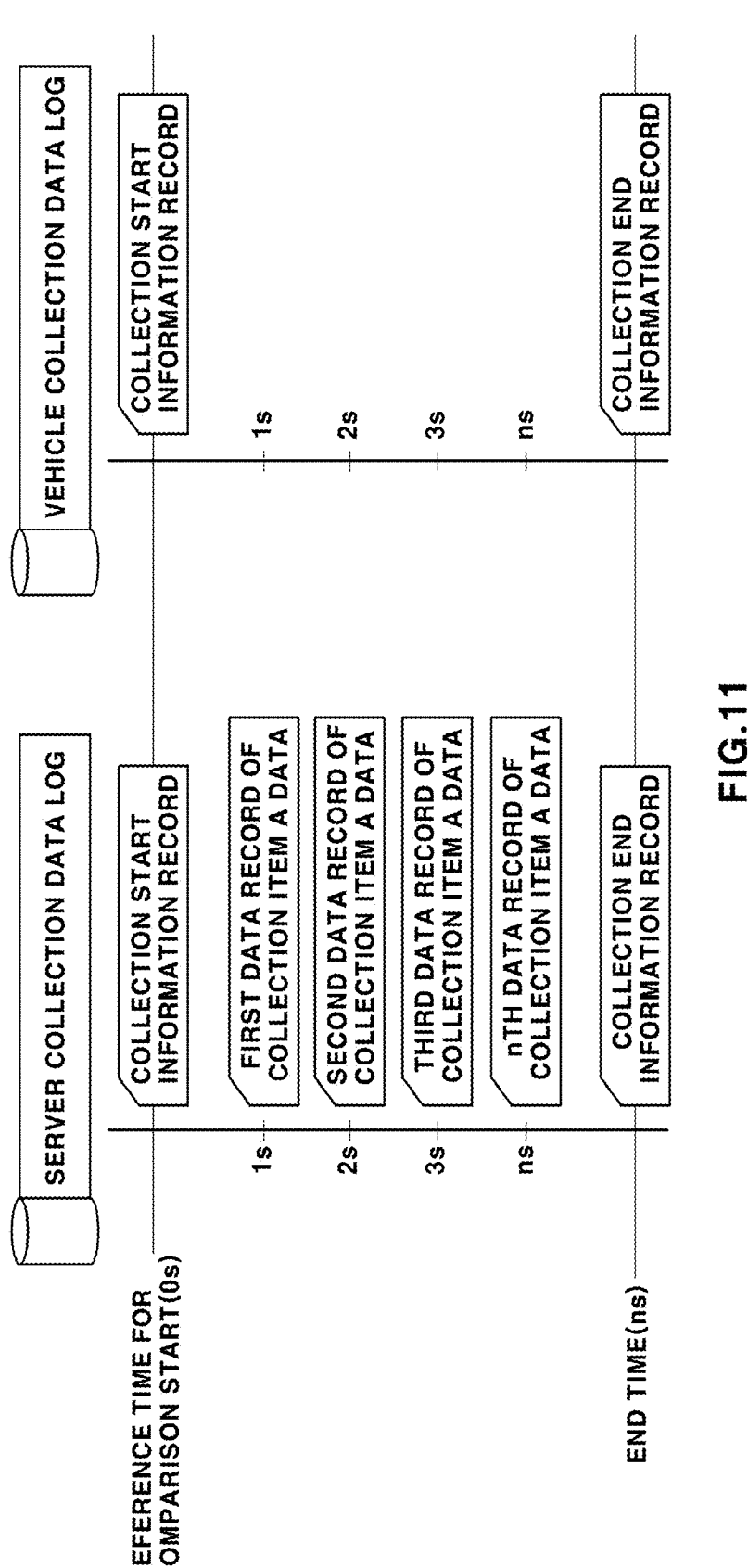
FIG. 11 is a diagram illustrating a method of setting a data comparison reference time of the normally registered server collection data set and vehicle collection data set in the vehicle data consistency verification method according to an exemplary embodiment of the present disclosure.

For example, as shown in FIG. 11, the comparison reference time of the server collection data set may be set to a timestamp value preset and included in the collection start information record of the server collection data set as a reference time for starting comparison, and as shown in FIG. 11, the comparison reference time of the vehicle collection data set may be set to a timestamp value preset and included in the collection start information record of the vehicle collection data set as a reference time for starting comparison.

Furthermore, a comparison end time of the server collection data set may be set to a timestamp value included in a collection end information record of the server collection data set, and a comparison end time of the vehicle collection data set may be set to a timestamp value included in a collection end information record of the vehicle collection data set.

In the present instance, there is comparison target data of the server collection data for comparison with the vehicle collection data every second from the comparison reference time of the server collection data set to an end time (refer to a part described in FIG. 11 from a first data record of collection item A data to an nth data record of collection item A data).

It is obvious that there is comparison target data (not shown in FIG. 11) of the vehicle collection data for comparison with the server collection data every second from the comparison reference time of the vehicle collection data set to the end time.

The comparison range of the server collection data set may be set to comparison target data of server collection data present every second from the comparison reference time to the end time (refer to the part described in FIG. 11 from the first data record of collection item A data to the nth data record of collection item A data), and the comparison range of the vehicle collection data set may be set to comparison target data of vehicle collection data present every second from the comparison reference time to the end time.

To the present end, the data consistency determination unit 33 of the automated data verification device 30 searches for presence of comparison target data of vehicle collection data which may be compared with the comparison target data of the server collection data present from the comparison reference time to the end time (refer to the part described in FIG. 11 from the first data record of collection item A data to the nth data record of collection item A data).

Figure 12:
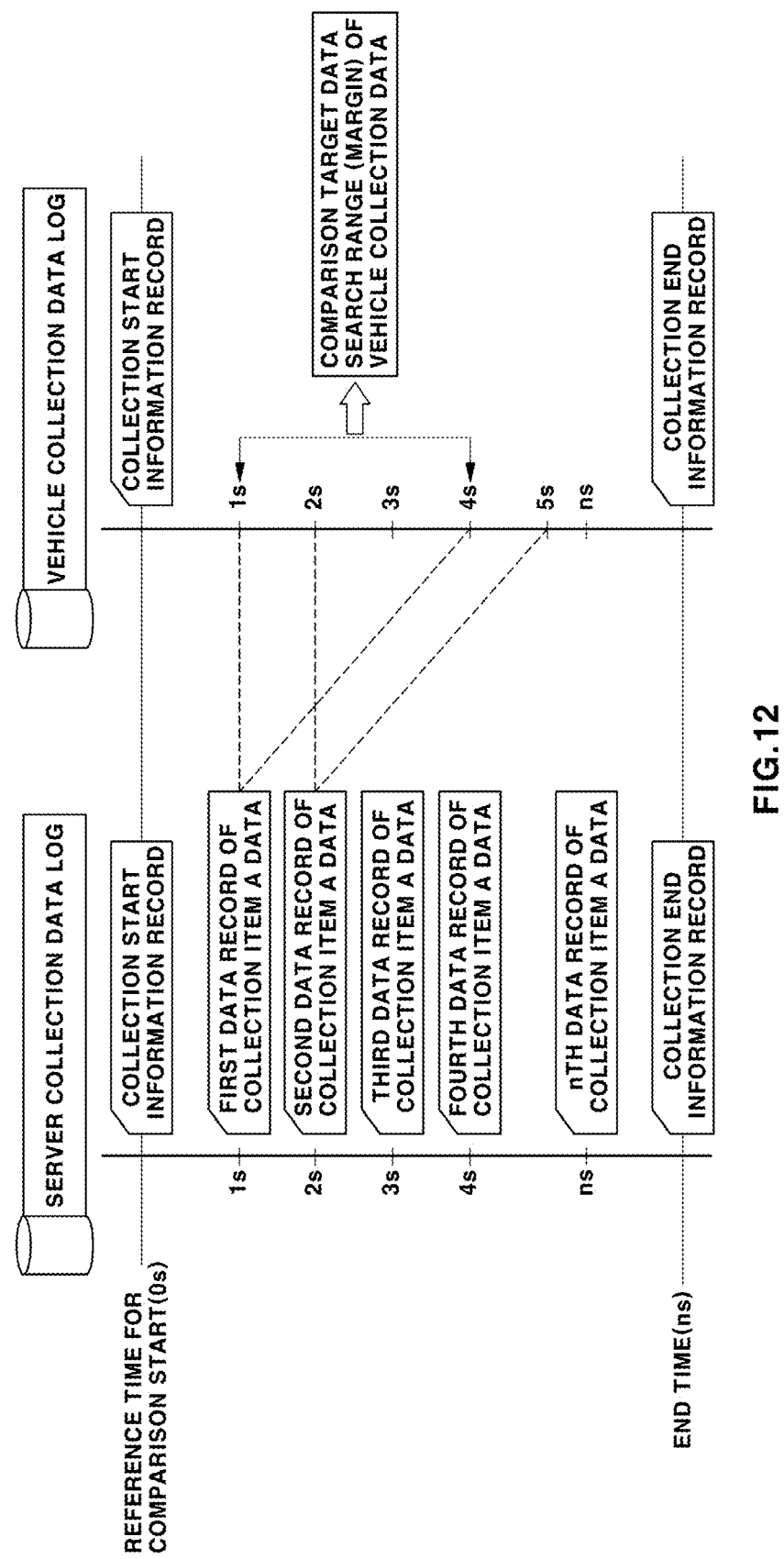
FIG. 12 is a diagram illustrating a method of setting a data comparison determination range of the normally registered server collection data set and vehicle collection data set in the vehicle data consistency verification method according to an exemplary embodiment of the present disclosure.

Preferably, considering that the comparison reference time of the server collection data and the comparison reference time of the vehicle collection data are not the same, as shown in FIG. 12, a time margin is provided to a search range for the comparison target data of the vehicle collection data for comparison with the comparison target data of the server collection data.

Accordingly, the data consistency determination unit 33 of the automated data verification device 30 searches for presence of the comparison target data of the vehicle collection data which may be compared with the comparison target data of the server collection data present from the comparison reference time to the end time, and searches for the comparison target data of the vehicle collection data present after a delay time when a data record of the comparison target data of the vehicle collection data is generated later than a data record of the comparison target data of the server collection data by the delay time (about 1 second later).

Next, a data consistency determination step is performed to determine whether the comparison target data of the server collection data present within the comparison reference time and the comparison determination range is the same as the comparison target data of the vehicle collection data (S107).

In other words, the data consistency determination step is performed by the data consistency determination unit 33 of the automated data verification device 30 to determine whether the comparison target data of the server collection data present from the comparison reference time to the end time is the same as the searched comparison target data of the vehicle collection data (S107).

That is, the comparison target data present in the first data record to the nth data record of collection item A data in the comparison target data of the server collection data present from the comparison reference time to the end time is compared with the searched comparison target data of the vehicle collection data with a time margin as described above, and whether the comparison target data is the same as the searched comparison target data is determined.

Figure 13:
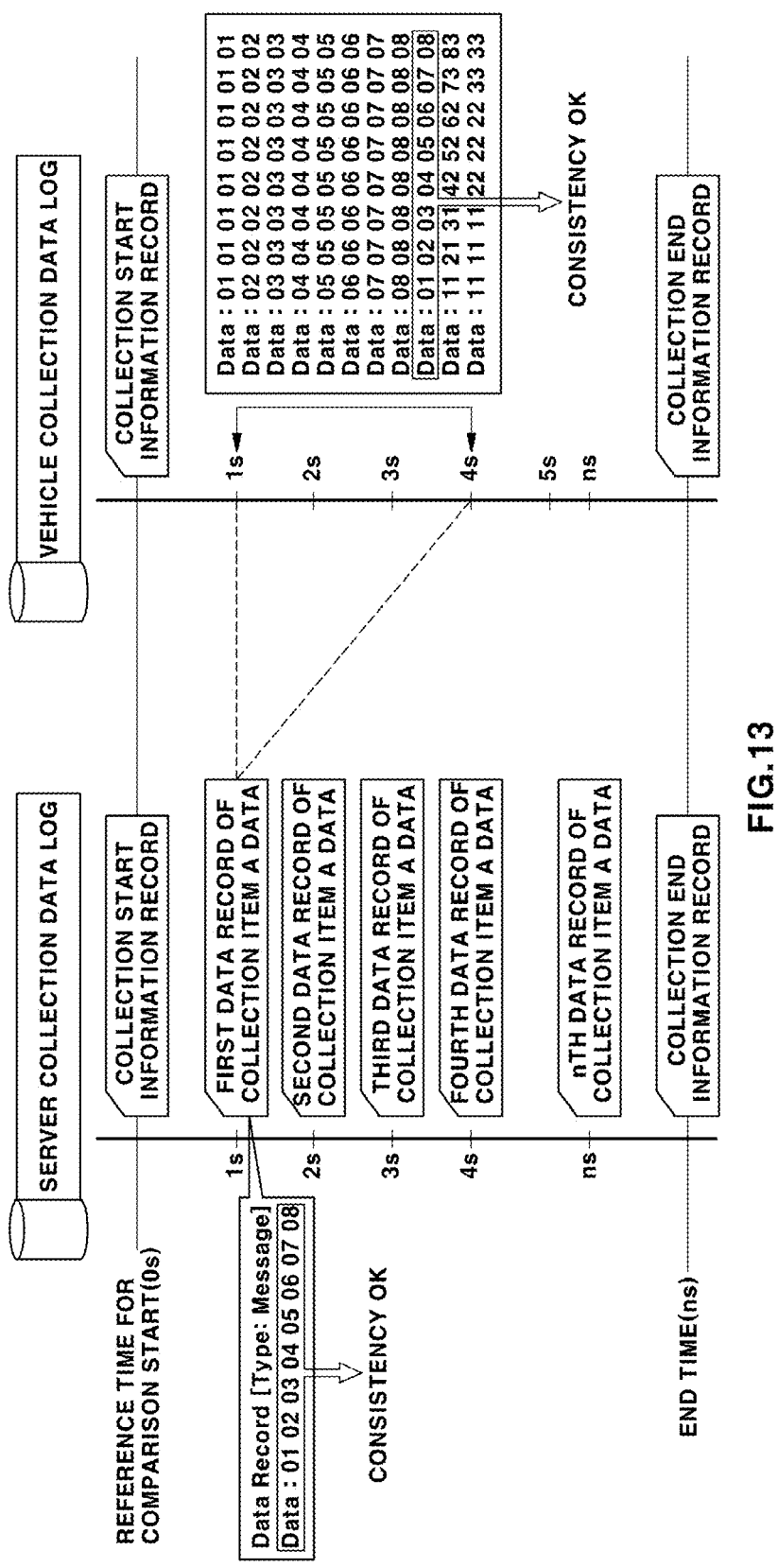
FIG. 13 is a diagram illustrating a data consistency determination example of determining whether the normally registered server collection data and vehicle collection data are the same in the vehicle data consistency verification method according to an exemplary embodiment of the present disclosure.

For example, as shown in FIG. 13, when the first data record of collection item A data in the comparison target data of the server collection data present from the comparison reference time to the end time is a data record of a message type (Data Record [Type: Message]), comparison target data "Data: 01 02 03 04 05 06 07 08" is present in the data record of the present message type, and data "Data: 01 02 03 04 05 06 07 08" is present in the searched comparison target data of the vehicle collection data with a time margin as described above, it is possible to determine that the that the same data as both the server collection data and the vehicle collection data is present.

Finally, the data consistency determination unit 33 of the automated data verification device 30 compares the comparison target data of the server collection data present from the comparison reference time to the end time with the comparison target data of the vehicle collection data, and determines data consistency of the server collection data as OK when the comparison target data of the server collection data is the same as the comparison target data of the vehicle collection data (S108). On the other hand, the data consistency determination unit 33 compares the comparison target data of the server collection data present from the comparison reference time to the end time with the comparison target data of the vehicle collection data, and determines data consistency of the server collection data as FAIL when the comparison target data of the server collection data is different from the comparison target data of the vehicle collection data (S109).

Vehicle data collected from the vehicle (e.g., actual driving information, controller status information, event data record (EDR) information, failure information, and diagnostic information) can be accurately collected, and the collected data can be used to improve the vehicle manufacturing process.

In the present way, reliability of vehicle data collected on the server may be improved through data consistency verification for server collection data transmitted in real time from the vehicle and stored on the server. Accordingly, the vehicle data collected on the server may be actively and efficiently used to improve productivity through improvement of vehicle manufacturing processes, strengthen consumer service capabilities, and generate new business models.

By solving the above problems, various aspects of the present disclosure are directed to providing the following effects.

First, by conducting data validity and data consistency verification on various vehicle data transmitted from the vehicle and collected and stored on the server, it is possible to improve accuracy and reliability of vehicle data collected on the server.

Second, by improving reliability of vehicle data collected on the server through data validity and data consistency verification for various vehicle data transmitted from the vehicle and collected on the server, the vehicle data collected on the server may be actively and efficiently used to improve productivity through improvement of vehicle manufacturing processes, strengthen consumer service capabilities, and generate new business models.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured for processing data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle data consistency verification system comprising:
a server configured to store server collection data, which is vehicle data transmitted through a server-dedicated gateway included in a network system of a vehicle; and
an automated data verification device configured to collect server collection data transmitted from the server, directly collect vehicle collection data, which is vehicle data generated from electrical components and controllers of a vehicle, then inspect data validity of the server collection data and the vehicle collection data, compare the vehicle collection data and the server collection data having data validity with each other, and verify data consistency of the server collection data,
wherein the automated data verification device includes:
a data collection circuitry configured to collect the server collection data from the server and to collect the vehicle collection data from the electrical components and the controllers of the vehicle;
a data validity inspection circuitry configured to inspect the data validity of the server collection data and the vehicle collection data collected by the data collection circuitry; and
a data consistency determination circuitry configured to determine the data consistency of the server collection data by comparing the vehicle collection data and the server collection data having the data validity with each other,
wherein the server collection data are the vehicle data transmitted through the server-dedicated gateway included in the network system of the vehicle, and
wherein the vehicle collection data are the vehicle data measured directly by a data automation verification equipment from the vehicle, and include actual driving information, state information of the controller, accident recording device information, failure information, and diagnostic information.

2. The vehicle data consistency verification system of claim 1, wherein the data validity inspection circuitry is configured to perform log validity inspection and set validity inspection on the server collection data and the vehicle collection data collected by the data collection circuitry.

3. The vehicle data consistency verification system of claim 1, wherein the data consistency determination circuitry is configured to determine whether the server collection data validated by the data validity inspection circuitry is normally registered, set a data comparison reference time and a data comparison determination range between the normally registered server collection data set and a vehicle collection data set, and determine the data consistency of the server collection data.

4. The vehicle data consistency verification system of claim 3, wherein the data consistency determination circuitry is further configured for:

verifying whether data registered as a collection item in advance is present in the server collection data determined as data validity OK;

determining that normal data registration is OK in response that data registered as a collection item is present in the server collection data; and determining that normal data registration is FAIL in response that the data registered as the collection item is not present in the server collection data.

5. The vehicle data consistency verification system of claim 3, wherein a comparison determination range of the server collection data set is set to comparison target data of server collection data present every second from a comparison reference time to an end time, and a comparison determination range of the vehicle collection data set is set to comparison target data of vehicle collection data present every second from the comparison reference time to the end time.

6. The vehicle data consistency verification system of claim 3, wherein the determining of the data consistency includes:

comparing comparison target data of server collection data present from a comparison reference time to an end time with comparison target data of the vehicle collection data, and determining that the data consistency of the server collection data is OK in response that the comparison target data of the server collection data is a same as the comparison target data of the vehicle collection data, and comparing the comparison target data of the server collection data present from the comparison reference time to the end time with the comparison target data of the vehicle collection data, and determining that the data consistency of the server collection data is FAIL in response that the comparison target data of the server collection data is different from the comparison target data of the vehicle collection data.

7. A vehicle data consistency verification method comprising:

collecting server collection data and vehicle collection data by a data collection circuitry of an automated data verification device;

performing data validity inspection including log validity inspection and setting validity inspection on the collected server collection data and vehicle collection data by a data validity inspection circuitry of the automated data verification device;

determining whether server collection data determined as data validity OK is normally registered by a data consistency determination circuitry of the automated data verification device;

setting a data comparison reference time and a comparison determination range of a vehicle collection data set and a server collection data set determined as normal data registration OK by a data consistency determination circuitry of the automated data verification device; and determining data consistency to determine whether comparison target data of server collection data present within the comparison reference time and the comparison determination range is a same as comparison target data of the vehicle collection data, wherein the automated data verification device includes:

the data collection circuitry configured to collect the server collection data from a server and to collect the vehicle collection data from electrical components and controllers of a vehicle;

the data validity inspection circuitry configured to inspect the data validity of the server collection data and the vehicle collection data collected by the data collection circuitry; and the data consistency determination circuitry configured to determine the data consistency of the server collection data by comparing the vehicle collection data and the server collection data having the data validity with each other, wherein the server collection data are vehicle data transmitted through a server-dedicated gateway included in a network system of the vehicle, and wherein the vehicle collection data are vehicle data measured directly by a data automation verification equipment from the vehicle, and include actual driving information, state information of the controller, accident recording device information, failure information, and diagnostic information.

8. The vehicle data consistency verification method of claim 7, wherein the log validity inspection on the server collection data and the vehicle collection data includes a process of determining whether collection start record information on the server collection data and the vehicle collection data is present, and a process of determining whether collection end record information on the server collection data and the vehicle collection data is present.

9. The vehicle data consistency verification method of claim 8, wherein, in response that the collection start record information is not present in the server collection data and the vehicle collection data, or the collection end record information is not present in the server collection data and the vehicle collection data, data validity of the server collection data and the vehicle collection data is determined to be FAIL.

10. The vehicle data consistency verification method of claim 8, wherein, in response that the collection start record information and the collection end record information are present in the server collection data and the vehicle collection data, data validity of the server collection data and the vehicle collection data is determined to be OK.

11. The vehicle data consistency verification method of claim 7, wherein the set validity inspection on the server collection data and the vehicle collection data includes a process of determining whether a number of server collection data sets is a same as a number of vehicle collection data sets, and a process of determining whether a last data set of the server collection data sets is a same as a last data set of the vehicle collection data sets.

12. The vehicle data consistency verification method of claim 11, wherein, in response that the number of server collection data sets is different from the number of vehicle collection data sets, data validity of the server collection data and the vehicle collection data is determined to be FAIL.

13. The vehicle data consistency verification method of claim 11, wherein, in response that the last data of the server collection data sets is different from the last data set of the vehicle collection data sets, the set validity inspection is restarted.

14. The vehicle data consistency verification method of claim 12, wherein, upon determining that the number of server collection data sets is a same as the number of vehicle collection data sets, and upon determining that the last data of the server collection data sets is a same as the last data set of the vehicle collection data sets, data validity of the server collection data and the vehicle collection data is determined to be OK.

15. The vehicle data consistency verification method of claim 7, wherein the determining of whether server collection data determined as data validity OK is normally registered includes:

verifying whether data registered as a collection item in advance is present in the server collection data determined as data validity OK;

determining that normal data registration is OK in response that data registered as a collection item is present in the server collection data; and determining that the normal data registration is FAIL in response that the data registered as the collection item is not present in the server collection data.

16. The vehicle data consistency verification method of claim 7, wherein a comparison reference time of the server collection data set is set to a timestamp value included in a collection start information record of the server collection data set, and a comparison reference time of the vehicle collection data set is set to a timestamp value included in collection start information of the vehicle collection data set.

17. The vehicle data consistency verification method of claim 7, wherein a comparison determination range of the server collection data set is set to comparison target data of server collection data present every second from the comparison reference time to an end time, and a comparison determination range of the vehicle collection data set is set to comparison target data of vehicle collection data present every second from the comparison reference time to the end time.

18. The vehicle data consistency verification method of claim 7, wherein the determining of the data consistency includes:

comparing comparison target data of server collection data present from the comparison reference time to an end time with comparison target data of the vehicle collection data, and determining that data consistency of the server collection data is OK in response that the comparison target data of the server collection data is a same as the comparison target data of the vehicle collection data, and comparing the comparison target data of the server collection data present from the comparison reference time to the end time with the comparison target data of the vehicle collection data, and determining that data consistency of the server collection data is FAIL in response that the comparison target data of the server collection data is different from the comparison target data of the vehicle collection data.

\* \* \* \* \*